(12) United States Patent
Schimelpfenig et al.

(10) Patent No.: US 10,320,326 B2
(45) Date of Patent: Jun. 11, 2019

(54) PHOTOVOLTAIC SYSTEM BEARING ASSEMBLY

(71) Applicant: SUNPOWER CORPORATION, San Jose, CA (US)

(72) Inventors: Mark Adam Schimelpfenig, Hayward, CA (US); Tyler Grushkowitz, Hayward, CA (US); Brian Wares, San Francisco, CA (US)

(73) Assignee: SunPower Corporation, San Jose, CA (US)

( * ) Notice: Subject to any disclaimer, the term of this patent is extended or adjusted under 35 U.S.C. 154(b) by 181 days.

(21) Appl. No.: 15/254,991

(22) Filed: Sep. 1, 2016

(65) Prior Publication Data

US 2018/0062565 A1 Mar. 1, 2018

(51) Int. Cl.
| | |
|---|---|
| H02N 6/00 | (2006.01) |
| H01L 31/042 | (2014.01) |
| H02S 20/32 | (2014.01) |
| F16M 11/10 | (2006.01) |
| F24S 30/425 | (2018.01) |
| F24S 30/00 | (2018.01) |

(52) U.S. Cl.
CPC ............ *H02S 20/32* (2014.12); *F16M 11/10* (2013.01); *F24S 30/425* (2018.05); *F24S 2030/15* (2018.05)

(58) Field of Classification Search
CPC ................................ H02S 20/32; F16M 11/10
See application file for complete search history.

(56) References Cited

U.S. PATENT DOCUMENTS

| | | | |
|---|---|---|---|
| 9,035,168 B2 | 5/2015 | Barton | |
| 9,279,457 B2 | 3/2016 | Grushkowitz | |
| 9,322,437 B2 | 4/2016 | Agullo | |
| 9,395,104 B2 | 7/2016 | Grushkowitz | |
| 2011/0041834 A1 | 2/2011 | Liao | |
| 2012/0180845 A1 | 7/2012 | Cole et al. | |
| 2013/0039610 A1* | 2/2013 | Schneider | F16C 17/02 384/428 |
| 2013/0160816 A1 | 6/2013 | Barton | |
| 2014/0182654 A1 | 7/2014 | Agullo | |
| 2014/0261626 A1 | 9/2014 | Agullo | |
| 2015/0187975 A1 | 7/2015 | Wares et al. | |

* cited by examiner

*Primary Examiner* — Angelo Trivisonno
(74) *Attorney, Agent, or Firm* — Schwabe, Williamson & Wyatt, P.C.

(57) ABSTRACT

A photovoltaic (PV) system having a bearing assembly to support PV modules is described. In an example, the bearing assembly includes a pair of bearing supports having respective sub-rims. The sub-rims may have complementary arcuate seat surfaces, which when combined, define a curved seat rim to receive a bearing sleeve. Accordingly, the bearing supports may be mounted symmetrically about a pile such that the sub-rims combine to support the bearing sleeve, and a torque tube holding the PV modules may be mounted on the bearing sleeve. More particularly, the torque tube may be in sliding contact with the bearing sleeve, and a weight of the PV modules and torque tube may be evenly transmitted through the pair of bearing supports to a shear center of the pile.

11 Claims, 8 Drawing Sheets

PHOTOVOLTAIC SYSTEM BEARING ASSEMBLY

BACKGROUND

Some sun-tracking solar power systems, such as utility-scale photovoltaic installations, are designed to pivot a large number of solar modules to track the movement of the sun. For example, a sun-tracking solar power system may include a row of solar modules supported on a torque tube. The torque tube may be driven by a motor drive to rotate the solar modules toward the sun. Bearing elements may be incorporated into the sun-tracking solar power system to support a load from the solar modules, including wind and snow loading on the solar modules. The bearing elements may allow for free rotation of the torque tube to enable the solar modules to track the sun.

DETAILED DESCRIPTION

Figure 1:
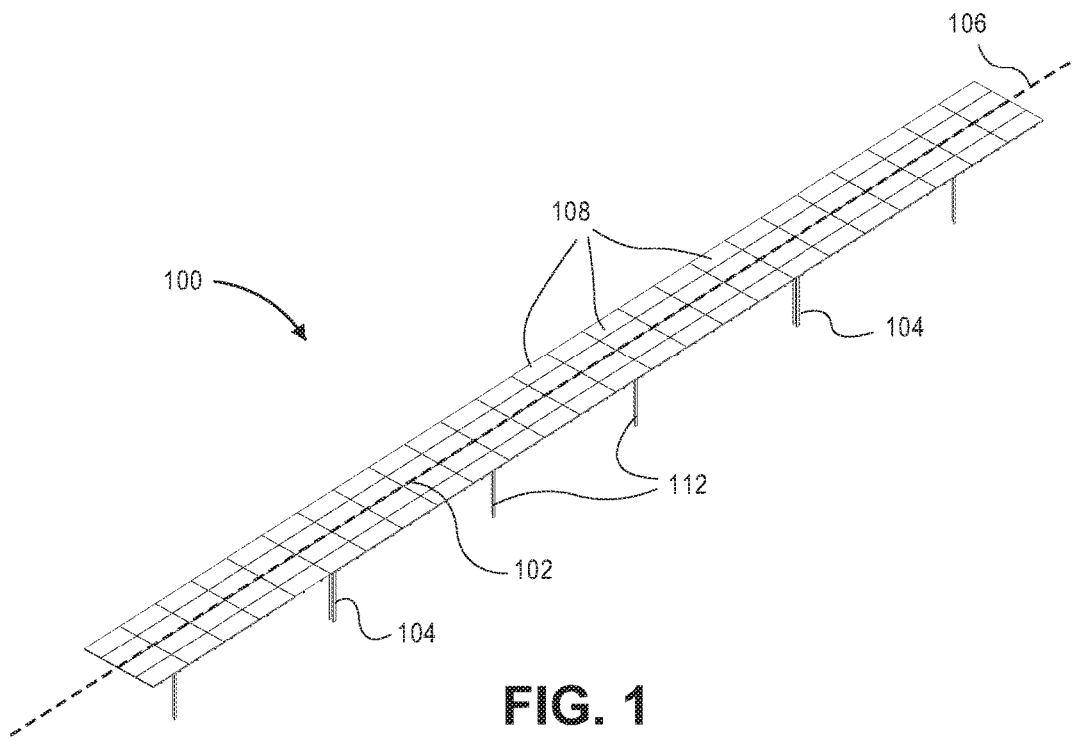
FIG. 1 illustrates a perspective view of a solar-tracking photovoltaic (PV) system, in accordance with an embodiment of the present disclosure.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps.

"Configured To." Various units or components may be described or claimed as "configured to" perform a task or tasks. In such contexts, "configured to" is used to connote structure by indicating that the units/components include structure that performs those task or tasks during operation. As such, the unit/component can be said to be configured to perform the task even when the specified unit/component is not currently operational (e.g., is not on/active). Reciting that a unit/circuit/component is "configured to" perform one or more tasks is expressly intended not to invoke 35 U.S.C. § 112, sixth paragraph, for that unit/component.

"First," "Second," etc. As used herein, these terms are used as labels for nouns that they precede, and do not imply any type of ordering (e.g., spatial, temporal, logical, etc.). For example, reference to a "first" fork does not necessarily imply that this fork is the first fork in a sequence; instead the term "first" is used to differentiate this fork from another fork (e.g., a "second" fork).

"Coupled"—The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically.

In addition, certain terminology may also be used in the following description for the purpose of reference only, and thus are not intended to be limiting. For example, terms such as "upper," "lower," "above," "below," "in front of," and "behind" refer to directions in the drawings to which reference is made. Terms such as "front," "back," "rear," "side," "outboard," "inboard," "leftward," and "rightward" describe the orientation and/or location of portions of a component, or describe the relative orientation and/or location between components, within a consistent but arbitrary frame of reference which is made clear by reference to the text and the associated drawings describing the component(s) under discussion. Such terminology may include the words specifically mentioned above, derivatives thereof, and words of similar import.

"Inhibit"—As used herein, inhibit is used to describe a reducing or minimizing effect. When a component or feature is described as inhibiting an action, motion, or condition it may completely prevent the result or outcome or future state completely. Additionally, "inhibit" can also refer to a reduction or lessening of the outcome, performance, and/or effect which might otherwise occur. Accordingly, when a component, element, or feature is referred to as inhibiting a result or state, it need not completely prevent or eliminate the result or state.

Although many of the examples described herein are for solar-tracking photovoltaic (PV) systems, the techniques and structures may apply equally to other non-solar-tracking or stationary solar energy collection systems, as well as concentrated thermal solar systems, etc. Moreover, although much of the disclosure is described in terms of ground-mounted solar-tracking solar energy collection installations, the disclosed techniques and structures apply equally to other solar energy collection installations, e.g., rooftop solar installations.

Existing bearing elements for solar-tracking solar power systems include a single bearing support mounted on one side of a supporting beam structure, and thus, loading on the bearing element from the torque tube is transmitted asymmetrically to only one side of the supporting beam structure. For example, the loading may be transmitted off-center from a shear center, i.e., offset from a neutral axis, of the supporting beam structure. The offset loading can increase an effective shear stress in the bearing element and apply bending stresses to the supporting beam structure. At the same time that shear stress is increased in the bearing components, an ability to distribute the shear stress through the addition of fastener joints between the bearing element and the supporting beam structure is limited by an area of the joined surfaces, and thus, shear resistance and strength of existing bearing solutions is not optimal.

In an aspect, a PV system includes a bearing assembly having a pair of bearing supports to support a PV module. The pair of bearing supports may be symmetrically disposed about a support pile, and attached to the pile by fastener joints that distribute shear stresses on opposite sides of the pile. Furthermore, the pair of bearing supports may have respective sub-rims, which combine to define a bearing seat to receive a bearing sleeve directly above the pile. Accordingly, a torque tube may be mounted on the bearing sleeve to transmit loading from PV modules through the bearing supports to the pile. The transmitted loading may be distributed evenly in the fastener joints to effectively load a shear center of the pile, thereby optimizing a shear resistance, and an ability to support weight, by the bearing assembly.

The aspects described above may be realized by the PV system having a pair of bottom bearing supports to support a PV module, as disclosed herein. In the following description, numerous specific details are set forth, such as specific material regimes and component structures, in order to provide a thorough understanding of embodiments of the present disclosure. It will be apparent to one skilled in the art that embodiments of the present disclosure may be practiced without these specific details. In other instances, well-known fabrication techniques or component structures, such as specific types of fasteners, are not described in detail in order to not unnecessarily obscure embodiments of the present disclosure. Furthermore, it is to be understood that the various embodiments shown in the figures are illustrative representations and are not necessarily drawn to scale.

By way of summary, a PV system includes a pile, a pair of bottom bearing supports mounted on the pile, and a torque tube mounted on the bottom bearing supports to support a PV module. The pair of bottom bearing supports may be bilaterally mounted on the pile. Each bottom bearing support may include a sub-rim having a bottom seat surface defined by an arcuate cross-sectional profile revolved around an axis of the torque tube. The sub-rims may combine to define a bottom seat rim, e.g., a U-shaped rim. Thus, a bearing sleeve may be mounted on the bottom seat rim directly above the pile, and the torque tube may be supported, and allowed to rotate, within the bearing sleeve on the bottom seat rim. Accordingly, the PV module may track a solar source when the torque tube pivots within the bearing assembly.

Referring to FIG. 1, a perspective view of a solar-tracking photovoltaic (PV) system is shown in accordance with an embodiment of the present disclosure. An electricity farm may include one or more solar-tracking PV systems 100. Solar-tracking PV system 100 may be considered a multi-drive system because several motor drives may be coupled to a same torque member to input torque to the torque member at longitudinally separated locations. For example, solar-tracking PV system 100 may be a dual-drive system having a pair of motor drives coupled to respective ends of a same torque tube 102, or torque tube section. In an embodiment, solar-tracking PV system 100 includes several driven support assemblies 104 supporting torque tube 102 above the ground at the longitudinally separated locations. Torque tube 102 may extend along a longitudinal shaft axis 106, and may be pivotable about shaft axis 106. Thus, solar-tracking PV system 100 may include a first driven support assembly 104 longitudinally separated from a second driven support assembly 104 in a direction of shaft axis 106.

Several PV modules 108 may be mounted on torque tube 102 along shaft axis 106. For example, solar-tracking PV system 100 may include a row of tens of PV modules 108 arranged in a series. The series may include, for example, 70-100 PV modules 108 between a first outward end and a second outward end. Each PV module 108 may include one or more solar collecting devices. For example, each PV module 108 may include a PV laminate mounted on a PV frame. The PV laminates may be configured to receive sunlight for conversion into electrical energy. For example, the PV laminates may include one or more PV cells laminated between an optically transparent upper cover and/or back cover.

Figure 2:
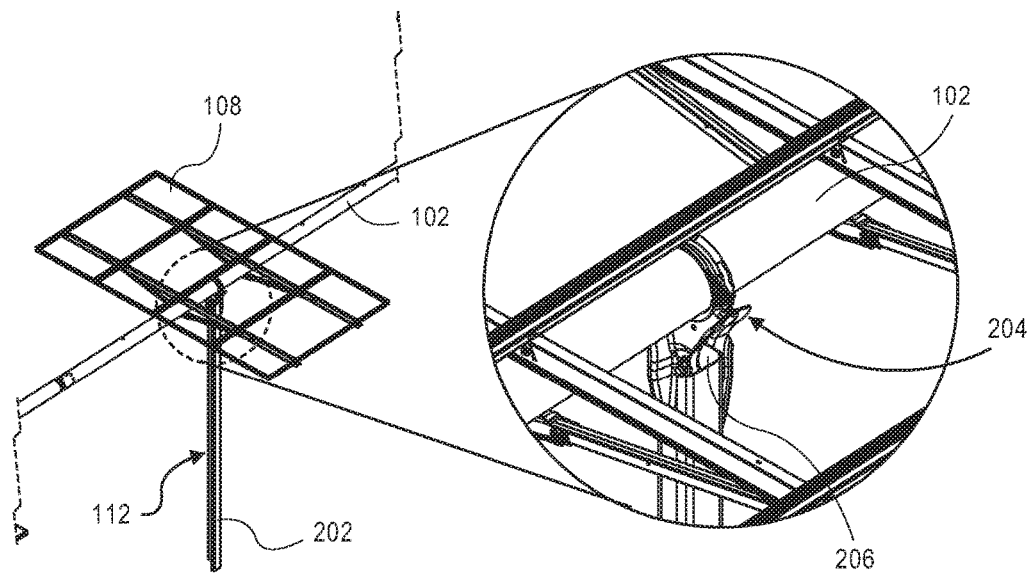
FIG. 2 illustrates a perspective view of a non-driven support assembly having a bearing assembly, in accordance with an embodiment of the present disclosure.

An orientation of PV module 108 may be considered a portrait orientation or a landscape orientation. The portrait orientation and the landscape orientation may be defined based on a relationship of a long edge of PV module 108 relative to torque tube 102, or to a north-south direction. Torque tube 102 may ordinarily be oriented such that shaft axis 106 extends in the north-south direction, allowing PV modules to rotate from east to west about shaft axis 106 to track the solar source. PV module 108 may have a rectangular profile, having a long edge and a short edge. In an embodiment, a portrait orientation of PV module 108 refers to an orientation of PV module 108 having the long edge perpendicular to torque tube 102 and/or shaft axis 106. The landscape orientation, by contrast, may be an orientation of PV module 108 having the short edge perpendicular to torque tube 102 and the long edge parallel to torque tube 102 (FIGS. 1-2). Accordingly, it will be appreciated that PV module 108 may be oriented in numerous manners relative to torque tube 102 within the scope of this description.

Each PV frame may support a respective PV laminate along an outer perimeter and/or a back surface of the laminate structure. The PV frame may in turn be mounted on torque tube 102. Thus, the PV laminate may be mounted vertically above torque tube 102 to track a solar source, e.g., the sun or a reflective surface redirecting sunrays toward PV modules 108, when torque tube 102 rotates about shaft axis 106.

In an embodiment, torque tube 102 is supported above the ground by one or more non-driven support assemblies 112. For example, a non-driven support assembly 112 may be positioned longitudinally between the first driven support assembly 104 and the second driven support assembly 104.

Each non-driven support assembly 112 along shaft axis 106 of torque tube 102 may support and allow for rotation of torque tube 102 about the shaft axis 106 without inputting torque to torque tube 102. Thus, non-driven support assemblies 112 may facilitate a stable rotation of torque tube 102 without actually driving such rotation.

Referring to FIG. 2, a perspective view of a non-driven support assembly having a bearing assembly is shown in accordance with an embodiment of the present disclosure. Non-driven support assembly 112 shown in FIG. 2 may be representative of each non-driven support assembly 112 of solar-tracking PV system 100. For example, non-driven support assembly 112 may be one of several non-driven support assemblies 112 located longitudinally between first driven support assembly 104 and second driven support assembly 104. Each non-driven support assembly 112 may include a supportive stand, such as a pile 202. Pile 202 may be a columnar structure having a web portion and a flange portion, as described below. For example, pile 202 may be an I-beam, or a different beam type. That is, pile 202 may include a different cross-sectional geometry having a web portion and a flange portion, e.g., a "C", "W", or "Z" beam profile. Alternatively, pile 202 may be a columnar structure without a web portion or a flange portion. For example, pile 202 may include a post or vertical tube having a round or rectangular cross-sectional profile.

Each non-drive pile 202 may carry a respective supportive mechanism, such as a bearing assembly 204. Bearing assembly 204 may be located at a pile end. For example, pile 202 may extend from a bottom end at the ground to an upper pile end 206 above the ground, and bearing assembly 204 may be mounted on pile 202 at the upper pile end 206. Bearing assembly 204 may support torque tube 102, and constrain transverse movement of torque tube 102. More particularly, bearing assembly 204 may constrain lateral movement of torque tube 102 while allowing torque tube 102 to rotate about shaft axis 106 when a motor drive of driven support assembly 104 inputs torque to torque tube 102. Accordingly, torque tube 102 may be mounted on or within bearing assembly 204 to pivot about shaft axis 106. Furthermore, PV module 108 may be mounted on torque tube 102 to track the solar source when torque tube 102 pivots about shaft axis 106.

Figure 3:
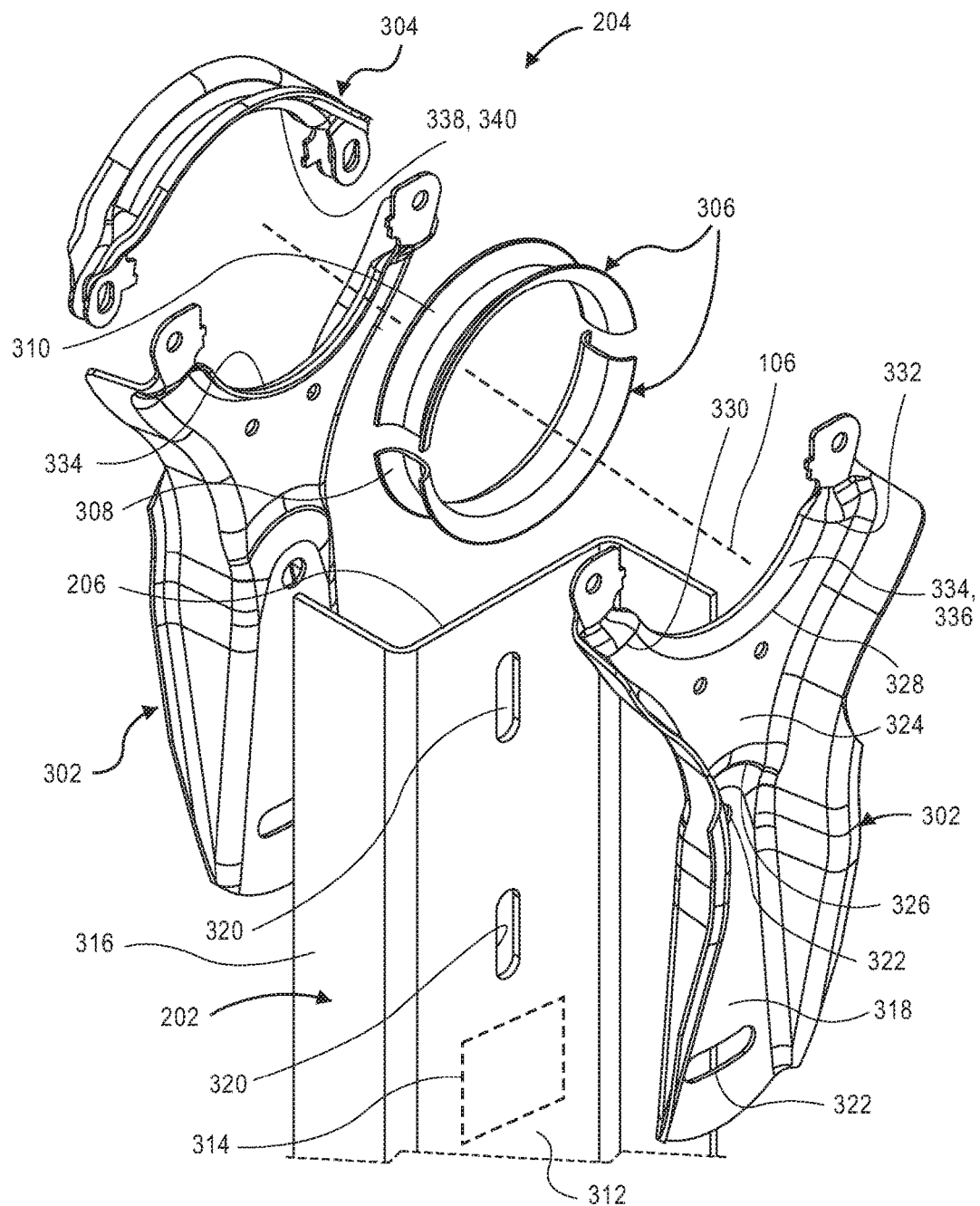
FIG. 3 illustrates an exploded perspective view of a bearing assembly mounted on a pile, in accordance with an embodiment of the present disclosure.

Referring to FIG. 3, an exploded perspective view of a bearing assembly mounted on a pile is shown in accordance with an embodiment of the present disclosure. Bearing assembly 204 may include several distinct structural components. In an embodiment, the structural components include a pair of bottom bearing supports 302, a top bearing support 304, and a bearing sleeve 306, which may have one or more components, e.g., a bottom bearing sleeve 308 and a top bearing sleeve 310. The structural components may connect pile 202 to torque tube 102 of PV system 100. More particularly, in combination with pile 202, bearing assembly 204 may resist a full system weight, including wind and snow loading, of PV modules 108 or supporting and constraining torque tube 102 regardless of an installation site terrain.

The pair of bottom bearing supports 302 may be mounted at pile end 206. In an embodiment, pile 202 includes a web portion 312 extending along a vertical plane 314. Vertical plane 314 may, for example, be a referential plane extending orthogonal to a horizon. More particularly, vertical plane 314 may contain a vertical axis extending from a point on the installation terrain to a center of the earth. Pile 202 may include a flange portion 316 coupled to web portion 312. For example, in the case of a "Z" beam (as shown), flange portion 316 may extend orthogonal to web portion 312 and vertical plane 314.

The pair of bottom bearing supports 302 may be bilaterally disposed about vertical plane 314. For example, each bottom bearing support 302 may include a shank portion 318, and the shank portions 318 may be fastened to web portion 312 such that the pair of bottom bearing supports 302 are symmetrically mirrored across vertical plane 314. In an embodiment, web portion 312 extends along vertical plane 314 and includes one or more fastener holes 320. Shank portion 318 of bottom bearing support 302 may include corresponding fastener holes 322, which align with fastener holes 320 of web portion 312 and fastener holes 322 of the other bottom bearing support 302, when bottom bearing supports 302 are bilaterally mounted on web portion 312. Accordingly, fasteners, e.g., a bolt or a pin, may be inserted through aligned fastener holes 320, 322 to attach the pair of bottom bearing supports 302 to pile 202.

Each bottom bearing support 302 may include a fork portion 324 extending from shank portion 318. For example, fork portion 324 may have a lower end 326 coupled to shank portion 318. An upper edge 328 of fork portion 324 may extend between a first fork end 330 and a second fork end 332. More particularly, upper edge 328 may extend along a curved path from first fork end 330 to second fork end 332 around shaft axis 106. Accordingly, fork portion 324 may have a generally Y-shaped profile, with a bottom of the Y being coupled to shank portion 318, and the upper ends of the Y being first fork end 330 and second fork end 332. Shaft axis 106 may extend orthogonal to vertical plane 314, and thus, upper edge 328 may be contained within a plane parallel and longitudinally offset from vertical plane 314.

In an embodiment, bottom bearing support 302 includes a sub-rim 334 coupled to upper edge 328 of fork portion 324. Sub-rim 334 is so named because each sub-rim 334 may form a division or portion of a seat rim when the pair of bottom bearing supports 302 are mounted together on pile 202. Each sub-rim 334 may include a bottom seat surface 336 having a first longitudinal edge connected to upper edge 328 of fork portion 324, and a second longitudinal edge disposed nearer to vertical plane 314 and adjacent to a corresponding second longitudinal edge of the mating bottom bearing support 302. Bottom seat surface 336 may have a cross-sectional profile taken about a plane containing shaft axis 106 and extending radially from shaft axis 106 through sub-rim 334. For example, the cross-sectional profile may be an arcuate cross-sectional profile having a curved line extending between upper edge 328 and the second longitudinal edge of sub-rim 334.

Figure 12:
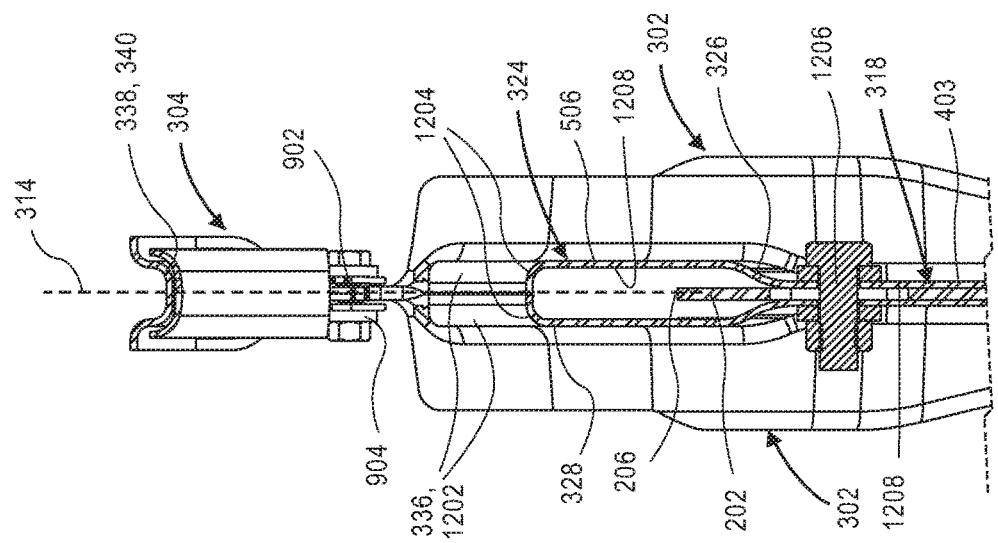
FIG. 12 illustrates a section view of a bearing assembly mounted on a pile, in accordance with an embodiment of the present disclosure.

The cross-sectional profile of bottom seat surface 336, e.g., the arcuate cross-sectional profile, may be revolved around shaft axis 106. For example, bottom seat surface 336 may have a partially toroidal shape in that it may include a profile contour along a first plane, and the profile contour may define a surface contour by rotating the first plane around shaft axis 106 between first fork end 330 and second fork end 332. In an embodiment, the bottom seat surfaces 336 of each bottom bearing support 302 are mirrored across vertical plane 314. For example, the cross-sectional profile of each bottom seat surface 336 may be an inverted half-U shape extending between upper edge 328 and the longitudinal edge at vertical plane 314, and when the sub-rims 334 are brought together when bottom bearing supports 302 are mounted on pile 202, the respective longitudinal edges may be adjacent to each other across vertical plane 314 such that the bottom seat surfaces 336 of the sub-rims 334 define a bottom seat rim having a substantially U-shaped cross-sectional profile (FIG. 12).

In an embodiment, bearing assembly 204 includes top bearing support 304 having a top seat rim 338. Top seat rim 338 may include a curved surface substantially mirroring the combined surfaces of the sub-rims 334 of the pair of bottom bearing supports 302. That is, top seat rim 338 may include a top seat surface 340 having a similar cross-sectional profile as the combined cross-sectional profiles of the sub-rims 334. For example, top seat surface 340 may have a U-shaped cross-sectional profile revolved around shaft axis 106. Thus, top seat surface 340 may have a first U-shaped cross-sectional profile, and the bottom seat rim defined by the combined bottom seat surfaces 336 may have a second U-shaped cross-sectional profile. Furthermore, the second U-shaped cross-sectional profile may meet the first U-shaped cross-sectional profile on diametrically opposite sides of shaft axis 106. Whereas the first U-shaped cross-sectional profile of top seat rim 338 directly above shaft axis 106 may have a concave upward orientation, the second U-shaped cross-sectional profile of the combined sub-rims 334 directly below shaft axis 106 may have a concave downward orientation. The combined top and bottom bearing supports 302 may therefore be assembled to form a circumferential rim extending around shaft axis 106 and having a substantially U-shaped, or other arcuate cross-sectional profile.

Figure 4:
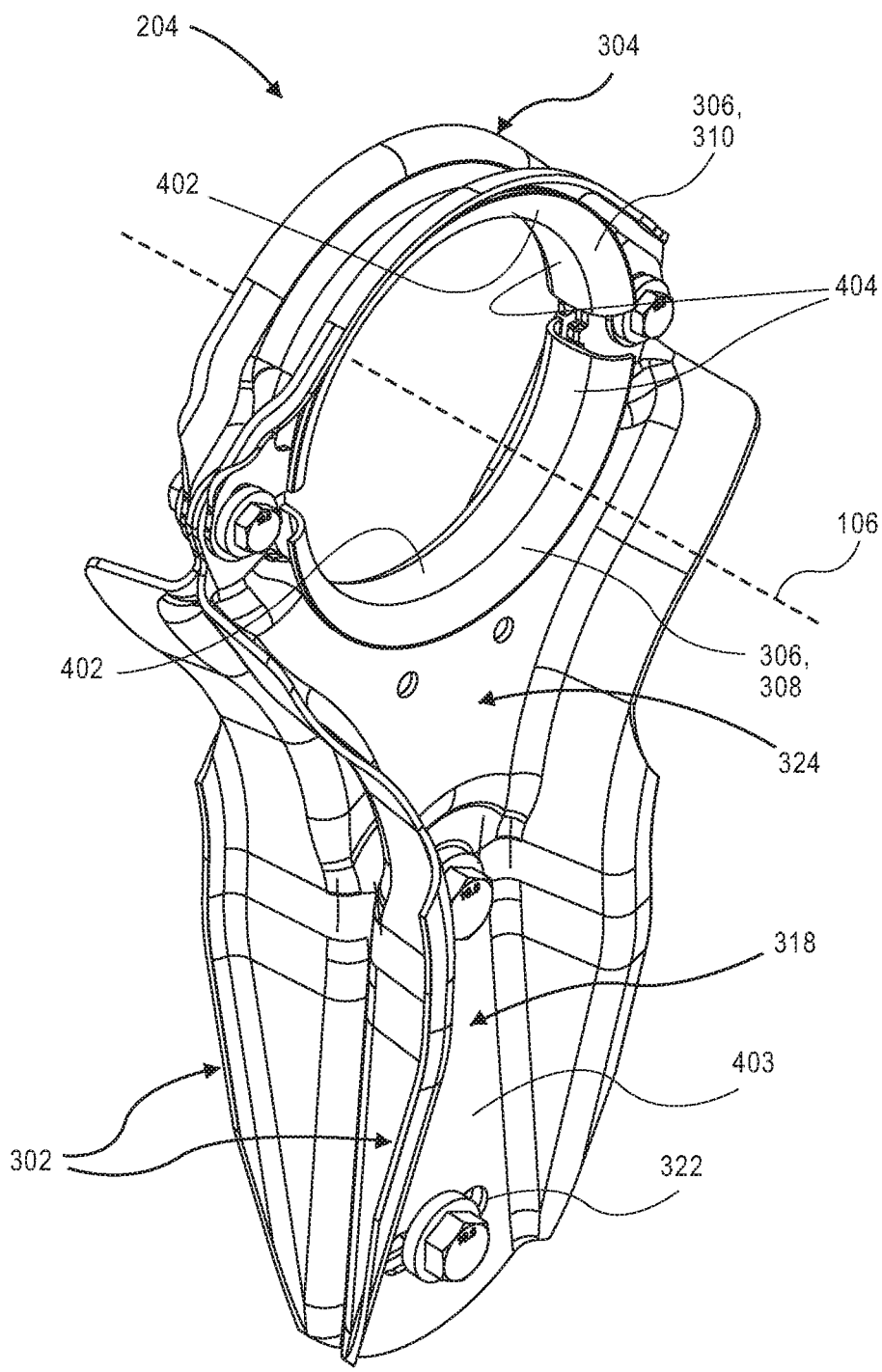
FIG. 4 illustrates a perspective view of a bearing assembly, in accordance with an embodiment of the present disclosure.

Referring to FIG. 4, a perspective view of a bearing assembly is shown in accordance with an embodiment of the present disclosure. One or more bearing sleeve 306 may be mounted on the circumferential rim formed by the assembly of top bearing support 304 and the pair of bottom bearing supports 302. For example, bottom bearing sleeve 308 may be mounted on the bottom seat rim, i.e., the bottom seat surfaces 336 of the mating sub-rims 334. Similarly, top bearing sleeve 310 may be mounted on top seat surface 340 of top seat rim 338. Bottom bearing sleeve 308 and/or top bearing sleeve 310 may extend over the respective seat surfaces. For example, whereas the sub-rims 334 may have respective bottom seat surfaces 336 that are placed adjacent to one another on opposite sides of vertical plane 314, bottom bearing sleeve 308 may extend over both bottom seat surfaces 336 across vertical plane 314 to form a continuous bearing surface on both sides of vertical plane 314.

Bearing sleeve(s) 306 may extend around shaft axis 106 to form a supportive bearing surface for torque tube 102. In an embodiment, top bearing sleeve 310 and bottom bearing sleeve 308 include respective semi-circular supportive surfaces 402. More particularly, the arcuate seat surfaces of each bearing sleeve 306 may be revolved around shaft axis 106 through an angle of approximately 180 degrees. Accordingly, each semi-circular supportive surface 402 may be partially toroidal in that the seat surfaces may be revolved around shaft axis 106 by less than a full rotation, and in that a cross-sectional profile of the supportive surface may be arcuate rather than circular.

The combination of semi-circular supportive surfaces 402 of top bearing sleeve 310 and bottom bearing sleeve 308 may define a circumferential supportive surface 404 around shaft axis 106. For example, semi-circular supportive surfaces 402 may combine to extend substantially around a circumference of torque tube 102 mounted between top bearing support 304 and bottom bearing supports 302. The term substantially is used to mean that bearing sleeve 306 may not extend fully around the circumference. For example, bearing sleeve 306 may have several components, and there may be a discontinuity, such as a gap, between ends of the separate bearing sleeve portions. Such a gap can be seen in FIG. 4 between ends of top bearing sleeve 310 and bottom bearing sleeve 308. Nonetheless, bearing sleeve 306 may extend around at least a majority of the circumference of torque tube 102.

It will be appreciated that a singular bearing sleeve 306 may be used in combination with the bearing supports. For example, bearing sleeve 306 may be a ring, i.e., may have a continuous supportive surface revolved fully around shaft axis 106. In such case, bearing sleeve 306 may be slid over torque tube 102 prior to simultaneously installing bearing sleeve 306 and torque tube 102 onto bearing supports 302. On the other hand, bearing sleeve 306 may have a discontinuous supportive surface that extends fully around shaft axis 106. For example, bearing sleeve 306 may be a ring having a slit through the wall at a single location along the ring circumference. Thus, bearing sleeve 306 may have a C-shape with ends facing each other across the slit. Bearing sleeve 306 may then be deformed to increase a gap between the ends, allowing bearing sleeve 306 to be flexed around torque tube 102 and then installed onto the seat surfaces of top and bottom bearing supports 302, 304.

In an embodiment, shank portion 318 includes a shank wall 403 having fastener holes 322. As described above, fastener holes 322 may align with each other, and may align with fastener holes 320 of pile 202. Fastener holes 320, 322 may be circular to receive a bolt or a pin of a predetermined diameter, or alternatively, fastener holes 320, 322 may be slots having a dimension in one direction that is greater than a dimension in another direction. Slotted fastener holes 320, 322 may allow bottom bearing supports 302 to be adjusted both vertically and laterally during mounting on pile 202. For example, fastener holes 320 of pile 202 may include slots extending in a vertical direction, and fastener holes 322 of bottom bearing supports 302 may include slots extending in a horizontal direction. When pile 202 is mounted on a slope and/or pile 202 is not driven into the ground perfectly vertically, bottom bearing supports 302 may be tilted to adjust for misalignment of pile 202 and to axially align all bearing assemblies of PV system 100 along shaft axis 106. More particularly, the slot shape of each fastener hole 320, 322 can allow an installer, after pile 202 is driven into the ground at an installation site, to adjust the position of the bearing assembly 204 so as to align bearing assembly 204 with a desired location of a torque tube 102.

Figure 5:
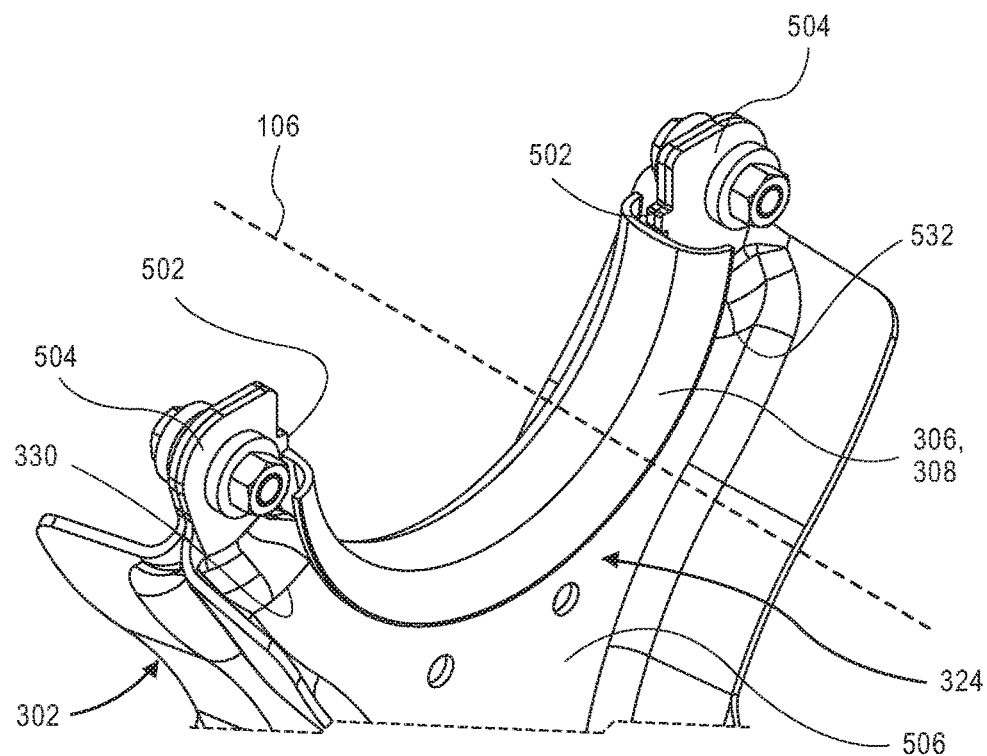
FIG. 5 illustrates a perspective view of a fork portion of a bearing assembly, in accordance with an embodiment of the present disclosure.

Referring to FIG. 5, a perspective view of a fork portion of a bearing assembly is shown in accordance with an embodiment of the present disclosure. The bearing supports of bearing assembly 204 may be configured to retain bearing sleeve(s) 306 on the seat surfaces. In an embodiment, top bearing support 304 and/or bottom bearing supports 302 include retention features extending radially inward relative to the seat surfaces so as to engage an end of bearing sleeve(s) 306. For example, one or more bottom bearing support 302 may include a pair of retention prongs 502. Retention prongs 502 may extend radially inward from a respective fastener tab 504 at the ends of fork portion 324. Fastener tabs 504 may be portions extending upward from first fork end 330 or second fork end 332. The fork ends may be defined as locations along fork portion 324 at which a fork wall 506, which extends parallel to vertical plane 314, converges longitudinally inward toward fastener tabs 504 extending along vertical plane 314.

Figure 6:
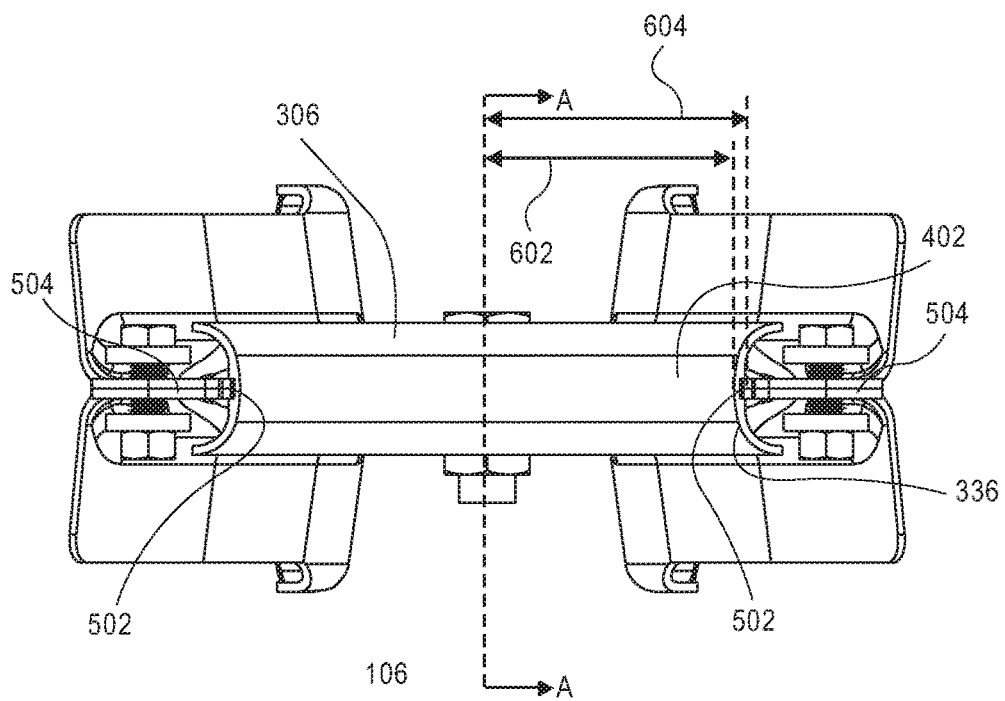
FIG. 6 illustrates a top view of a bottom portion of a bearing assembly, in accordance with an embodiment of the present disclosure.

Referring to FIG. 6, a top view of a bottom portion of a bearing assembly is shown in accordance with an embodiment of the present disclosure. Each retention prong 502 may extend radially inward from a respective fastener tab 504 at the fork ends toward shaft axis 106. A first distance 602 between retention prongs 502 and shaft axis 106 may be less than a second distance 604 between shaft axis 106 and bottom seat surface 336. Similarly, a radial distance between shaft axis 106 and semi-circular supportive surface 402 of bearing sleeve 306 may be greater than the radial distance between shaft axis 106 and retention prong 502. Accordingly, retention prong 502 will resist dislodgment of bearing sleeve 306 because retention prong 502 provides a stop against which an end of bearing sleeve 306 is retained. More particularly, retention prongs 502 provide features to retain bearing sleeves 306 against the seat surfaces of the bearing supports. Since retention prongs 502 act to retain bearing sleeves 306, bearing sleeves 306 may be formed from a stiffer and stronger material than would otherwise be used, and bearing sleeves 306 may be formed without particular retention features such as protrusions to engage bearing supportive surfaces that would otherwise be required.

Figure 7:
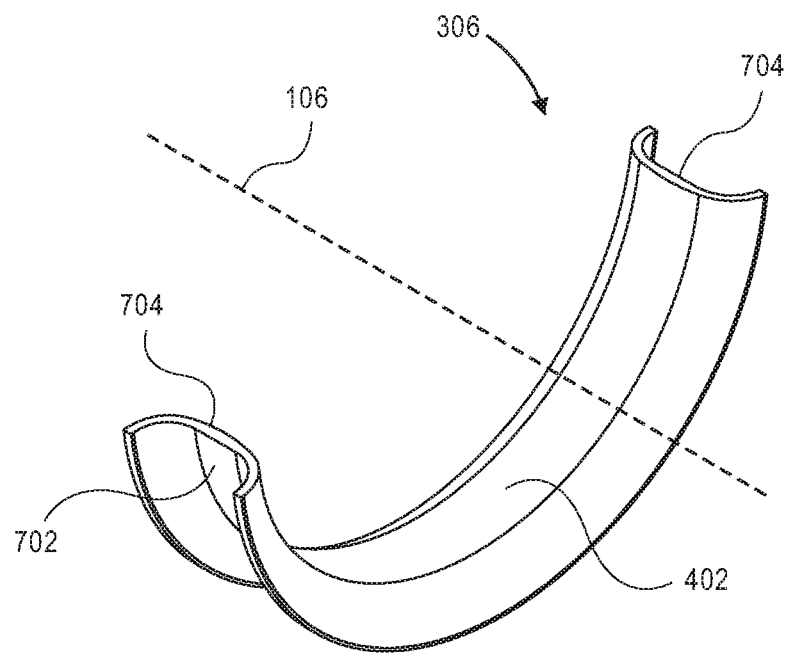
FIG. 7 illustrates a perspective view of a bearing sleeve, in accordance with an embodiment of the present disclosure.

Referring to FIG. 7, a perspective view of a bearing sleeve is shown in accordance with an embodiment of the present disclosure. Bearing sleeve 306 may have semi-circular supportive surface 402 facing shaft axis 106, and may have a supported surface 702 on an opposite side of a bearing wall. That is, supported surface 702 may face away from shaft axis 106. The simple curved wall of bearing sleeve 306 may be revolved around shaft axis 106 between sleeve ends 704. As described above, sleeve ends 704 may be retained by retention prongs 502 to prevent slipping of bearing sleeve 306 on the respective bearing support.

Figure 8:
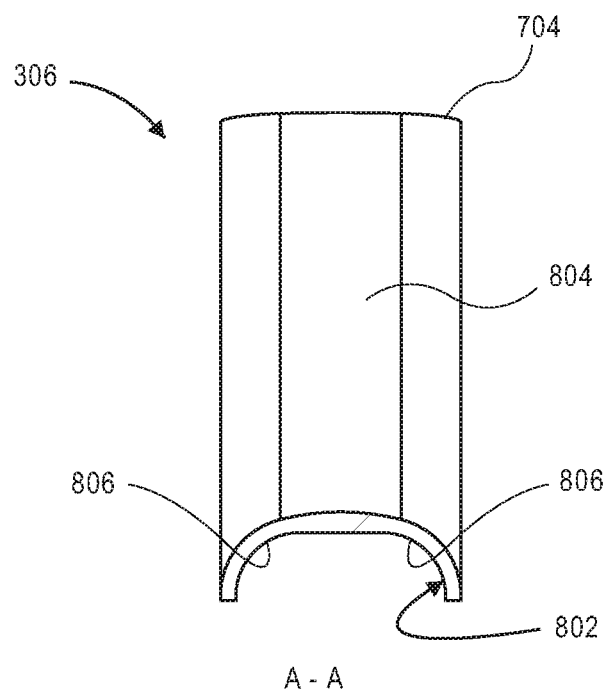
FIG. 8 illustrates a section view, taken about line A-A of FIG. 6, of a bearing sleeve, in accordance with an embodiment of the present disclosure.

Referring to FIG. 8, a section view, taken about line A-A of FIG. 6, of a bearing sleeve is shown in accordance with an embodiment of the present disclosure. Bearing sleeve(s) 306 may have a constant wall thickness. For example, supported surface 702 of bearing sleeve 306 may include a U-shaped cross-sectional profile 802, and semi-circular supportive surface 402 may have a similar U-shaped cross-sectional profile 802 offset above supported surface 702 by the wall thickness at all circumferential locations between ends 704. Alternatively, supported surface 702 and semi-circular supportive surface 402 may have different geometries.

U-shaped cross-sectional profile 802 may be revolved around shaft axis 106 to form a cylindrical band region 804 along vertical plane 314, and outer radial regions 806 forming concave downward surfaces to conform to the bottom seat rim (FIG. 12). Cylindrical band region 804 may be continuously and smoothly integrated with outer radial regions 806 such that the geometry of bearing sleeve 306 is well-suited to injection molding, extrusion, or compression molding. Accordingly, although bearing sleeve 306 can be made from any material, in an embodiment bearing sleeve 306 is formed from ultra-high molecular weight polyethylene (UHMWPE), which has advantageous characteristics of low friction and high strength. Bearing sleeve 306 may also be formed from other materials such as grease-soaked cotton, wood, Delrin, nylon, polyethylene, polyurethane, polytetrafluoroethylene, brass, polystyrene, polyoxymethylene, polyamide, other plastics, or other materials. It will be appreciated that the simplicity of the bearing sleeve geometry may minimize stress concentrations in impact loading, e.g., as applied by a rotating torque tube 102.

Figure 9:
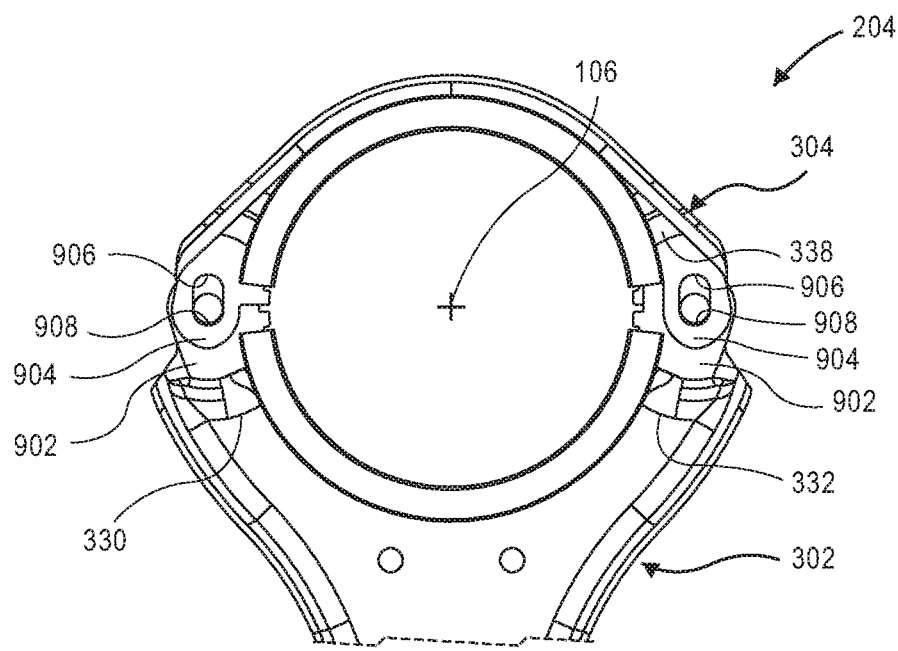
FIG. 9 illustrates a side view of a bearing assembly, in accordance with an embodiment of the present disclosure.

Referring to FIG. 9, a side view of a bearing assembly is shown in accordance with an embodiment of the present disclosure. Bearing assembly 204 may include several hinge joints and/or fastener joints to attach top bearing support 304 to bottom bearing support 302. In an embodiment, bottom bearing support 302 includes several lower fastener tabs 902 configured to couple to corresponding features of top bearing support 304. For example, each lower fastener tab 902 may extend from one of the fork ends, e.g., first fork end 330 or second fork end 332, toward top bearing support 304. Similarly, top bearing support 304 may include several upper fastener tabs 904 configured to couple to lower fastener tabs 902 of bottom bearing support 302. For example, upper fastener tabs 904 may be coupled to top seat rim 338 and/or extend from top seat rim 338 toward bottom bearing support 302. Accordingly, the fastener tabs 504 of top bearing support 304 and bottom bearing support 302 may overlap as they extend toward each other.

In an embodiment, the fastener tabs 504 of top bearing support 304 and bottom bearing support 302 include respective fastener holes. Top bearing support 304 may have upper fastener holes 906 extending through upper fastener tabs 904, and bottom bearing support 302 may have lower fastener holes 908 extending through lower fastener tabs 902. The respective fastener holes 906, 908 of upper fastener tabs 904 and lower fastener tabs 902 may be aligned with each other about axes extending parallel to shaft axis 106 and orthogonal to vertical plane 314. For example, a first fastener axis may extend through aligned upper fastener holes 906 and lower fastener holes 908 on a first side, e.g., a leftward side, of shaft axis 106. Similarly, a second fastener axis may extend through aligned upper fastener holes 906 and lower fastener holes 908 on a second side, e.g., a rightward side, of shaft axis 106. Accordingly, respective fasteners such as bolts or pins may be inserted through aligned fastener holes 906, 908 on both sides of shaft axis 106 to constrain upper fastener tabs 904 relative to lower fastener tabs 902 and to fix top bearing support 304 relative to bottom bearing support 302.

The fastener holes 906, 908 in the fastener tabs 504 may be configured to allow for some adjustment between top bearing support 304 and bottom bearing support 302. In an embodiment, at least one fastener hole 906, 908 may include a non-circular slot to allow for some relative movement between the corresponding fastener tabs. By way of example, upper fastener hole 906 may have a non-circular slot profile with a slot length extending in a vertical direction. The corresponding lower fastener hole 908 may have a circular hole profile sized to receive a fastener, such as a bolt, in a sliding fit. Accordingly, upper fastener tab 904 may be slid up or down relative to the bolt prior to tightening a nut onto the bolt to form a secure fastener joint. As such, some adjustability is provided between top bearing support 304 and bottom bearing support 302. Such adjustability may be provided on one or both sides of shaft axis 106. Thus, bearing assembly 204 may advantageously allow top bearing support 304 and bottom bearing support 302 to adjust to different torque tube dimensions and orientations by raising or lowering the bearing supports until bearing sleeve(s) 306 appose torque tube 102. Such adjustability can ease installation by allowing bearing assembly 204 to conform to torque tube 102 and to installation site terrain. For example, bearing assembly 204 may accommodate site slopes in the north-south direction of +/−10 degrees, which is unprecedented in PV system bearing assembly technologies.

It will be appreciated that, since different groups of fastener tabs 504 on each side of shaft axis 106 may be fastened by different fasteners, it is possible to move top bearing support 304 relative to bottom bearing support 302 in a hinged fashion. More particularly, top bearing support 304 may first be coupled to bottom bearing support 302 at fastener tabs 504 on a leftward side of shaft axis 106 using a bolt, and top bearing support 304 may then be swung relative to bottom bearing support 302 about the bolt. That is, the bolt may act as a hinge. Accordingly, top bearing support 304 may swing open to allow torque tube 102 to be installed onto bottom bearing sleeve 308, and then top bearing support 304 may swing closed to appose top bearing sleeve 310 to torque tube 102. A second bolt may then be inserted through fastener tabs 504 on a rightward side of shaft axis 106 to secure the bearing supports around torque tube 102. It will be appreciated that the hinged relationship between bearing supports may reduce installation times.

Figure 10:
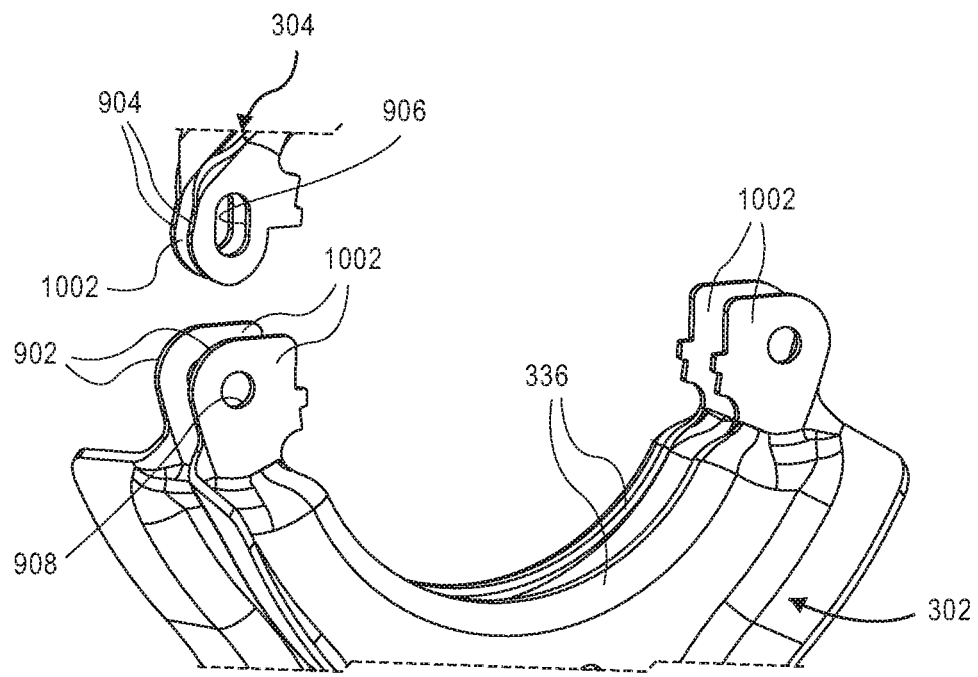
FIG. 10 illustrates an exploded perspective view of a fastening portion of a bearing assembly, in accordance with an embodiment of the present disclosure.

Referring to FIG. 10, an exploded perspective view of a fastening portion of a bearing assembly is shown in accordance with an embodiment of the present disclosure. Fastener tabs 902, 904 of top bearing support 304 and bottom bearing support 302 may provide a friction-based joint to secure the bearing sleeve(s) 306 against torque tube 102. More particularly, each fastener tab 504 may include one or more friction surface 1002 to engage with a corresponding friction surface 1002 of another fastener tab 504. By way of example, lower fastener tabs 902 may each include a pair of friction surfaces 1002 parallel to vertical plane 314. For example, a first bottom bearing support 302 may have a friction surface 1002 facing a friction surface 1002 of a second bottom bearing support 302, and the friction surfaces 1002 may be pressed against each other along vertical plane 314 when the first bottom bearing support 302 and second bottom bearing support 302 are mounted on pile 202.

The first bottom bearing support 302 and the second bottom bearing support 302 may also have respective friction surfaces 1002 facing outward away from vertical plane 314. In an embodiment, upper fastener tabs 904 of top bearing support 304 may straddle the lower fastener tabs 902 of the pair of bottom bearing supports 302. For example, top bearing support 304 may include at least two upper fastener tabs 904 having respective friction surfaces 1002 parallel to vertical plane 314 and facing the outward friction surfaces 1002 of lower fastener tabs 902.

It will be appreciated that multiple friction surfaces 1002 include advantages in addition to increasing a strength of the fastener joint. For example, multiple frictions surfaces reduces a number of fasteners that is required to assemble bearing assembly 204. That is, since a same fastener is effectively reused to assemble the bearing supports to each other and to pile 202, fewer fasteners need to be employed during installation. This both reduces material costs, and since fewer fasteners need to be installed, an installation time of bearing assembly 204 may be reduced.

Figure 11:
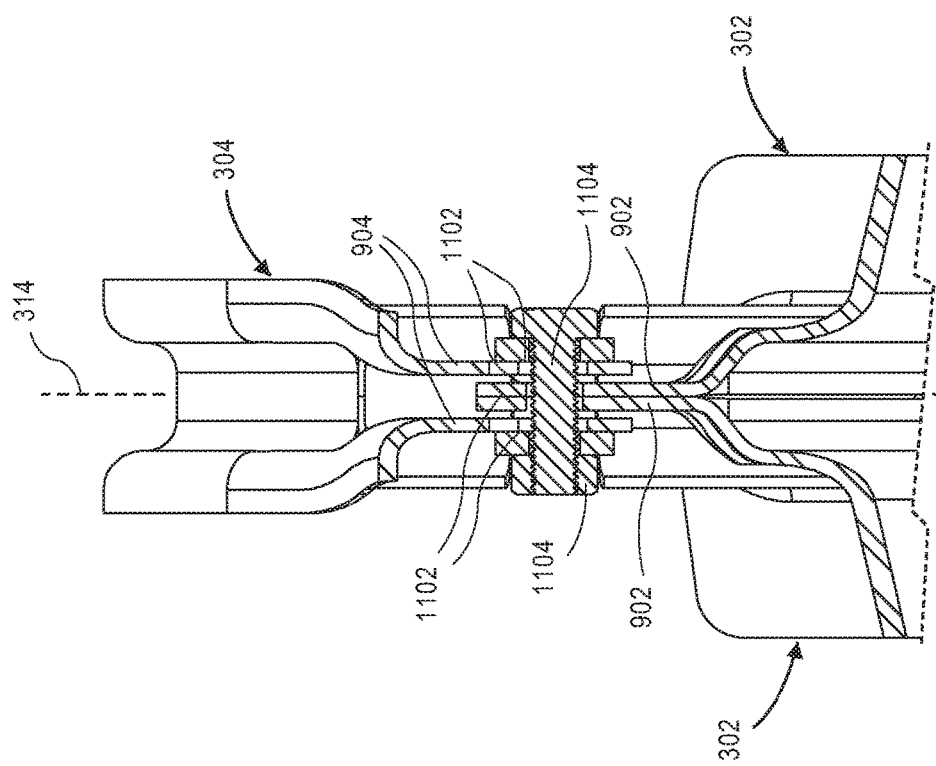
FIG. 11 illustrates a section view of a fastening portion of a bearing assembly, in accordance with an embodiment of the present disclosure.

Referring to FIG. 11, a section view of a fastening portion of a bearing assembly is shown in accordance with an embodiment of the present disclosure. As described above, top bearing support 304 may be placed over bottom bearing supports 302 such that the pair of upper fastener tabs 904 are longitudinally outward from the pair of lower fastener tabs 902. This sequence may be reversed, such that the pair of lower fastener tabs 902 are longitudinally outward from the pair of upper fastener tabs 904. In either case, at least four friction interfaces 1102 may be formed between the opposing friction surfaces 1002 of the fastener tabs 504 and the surfaces of fasteners 1104 used to hold friction surfaces 1002 together. More particularly, a fastener 1104, such as a bolt or a rivet, may extend through fastener holes 906, 908 of upper fastener tabs 904 and lower fastener tabs 902 to press friction surfaces 1002 together and form friction interfaces 1102. The friction interfaces 1102 create a friction joint to securely fasten top bearing support 304 to bottom bearing supports 302. Furthermore, shear loads applied to top bearing support 304 and bottom bearing supports 302 by a rotating torque tube 102 may be distributed at several locations along fastener 1104 by the individual fastener tabs 902, 904. Thus, an effective strength of the fastener joint may be increased because the shear load applied at any one point on fastener 1104 may be reduced.

Referring to FIG. 12, a section view of a bearing assembly mounted on a pile is shown in accordance with an embodiment of the present disclosure. When the pair of bottom bearing supports 302 are mounted on pile 202, and top bearing support 304 is fastened to bottom bearing supports 302 at the fastener tabs 902, 904, the respective bottom seat surfaces 336 of the bottom bearing supports 302 may come together at vertical plane 314 to form a bottom seat rim 1202. As described above, each bottom seat surface 336 may have an arcuate cross-sectional profile 1204, and in combination the cross-sectional profiles may form a supportive surface having a profile matching U-shaped cross-sectional profile 802 of bearing sleeve 306 (not shown). Similarly, top seat surface 340 may have a cross-sectional profile matching U-shaped cross-sectional profile 802 of top bearing sleeve 310. Accordingly, top seat rim 338 and bottom seat rim 1202 may form a toroidal supportive surface to hold bearing sleeve 306 around shaft axis 106 and along vertical plane 314 directly above pile 202.

Positioning bottom seat rim 1202 directly above pile 202 in the manner described above may advantageously balance a loading path through a shear center of pile 202. More particularly, when sub-rims 334 are symmetrically disposed about vertical plane 314, vertical loading from torque tube 102 may be divided between bottom bearing supports 302 on each side of vertical plane 314. These vertical load components may be transmitted through respective bottom bearing supports 302 to a pile fastener 1206 used to attach bottom bearing supports 302 to pile 202. That is, the vertical load components may be applied to pile fastener 1206 as shear loading at longitudinally separated locations on either side of vertical plane 314 and pile 202. Since the shear loading may be symmetrically disposed about vertical plane 314, an average load may be applied directly through a neutral axis of web portion 312 of pile 202 in a vertical direction. The distribution of shear loading may reduce a maximum shear stress in pile fastener 1206, effectively increasing the strength of the fastener joint. Furthermore, since the loading path is through the shear center of pile 202, additional off-axis bending stresses are reduced from bearing support designs that mount on only one side of web portion 312. Accordingly, the bilateral design of bearing assembly 204 creates a robust and effective design, regardless of a loading direction applied to the bearing supports.

Bottom bearing supports 302 may be formed to avoid any burrs or bulges that may exist at pile end 206. For example, bottom bearing supports 302 may curve outward from pile 202 around pile end 206 and then inward toward vertical plane 314 at which sub-rims 334 unite to form a spherical surface of bottom seat rim 1202. In an embodiment, shank wall 403 of shank portion 318 and fork wall 506 of fork portion 324 may have respective inward surfaces 1208 facing vertical plane 314. Shank wall 403 of shank portion 318 may be mounted on web portion 312 of pile 202. More particularly, inward surface 1208 of shank wall 403 may be apposed to web portion 312, and shank wall 403 may be fastened to pile 202 by pile fastener 1206. Inward surface 1208 of fork portion 324 may also face web portion 312 and/or vertical plane 314, however, inward surface 1208 of fork portion 324 may be laterally farther from vertical plane 314 then inward surface 1208 of shank wall 403. For example, fork wall 506 may be coupled to shank wall 403 at lower end 326 vertically below pile end 206, and fork walls 506 may effectively bifurcate out and around pile end 206 to avoid any burrs on pile end 206.

Fork portion 324 may extend upward and then curve back inward toward vertical plane 314. In an embodiment, upper edge 328 of fork portion 324 may be vertically above pile 202, i.e., higher than pile end 206. Thus, first fork end 330 and second fork end 332 may be above pile end 206. Sub-rims 334 may extend inward from upper edge 328 to meet along vertical plane 314 and to form a U-shaped cross-sectional profile of bottom seat rim 1202 to support bearing sleeve 306 directly over pile end 206.

Top bearing support 304 and bottom bearing support 302 may be formed from various materials and in various manners. For example, each bearing support may include stamped galvanized steel, e.g., 11 gauge steel, to form the support geometries. Such structure is offered by way of example, however, and other materials and manufacturing processes may be used to form the components of bearing assembly 204.

Figure 13:
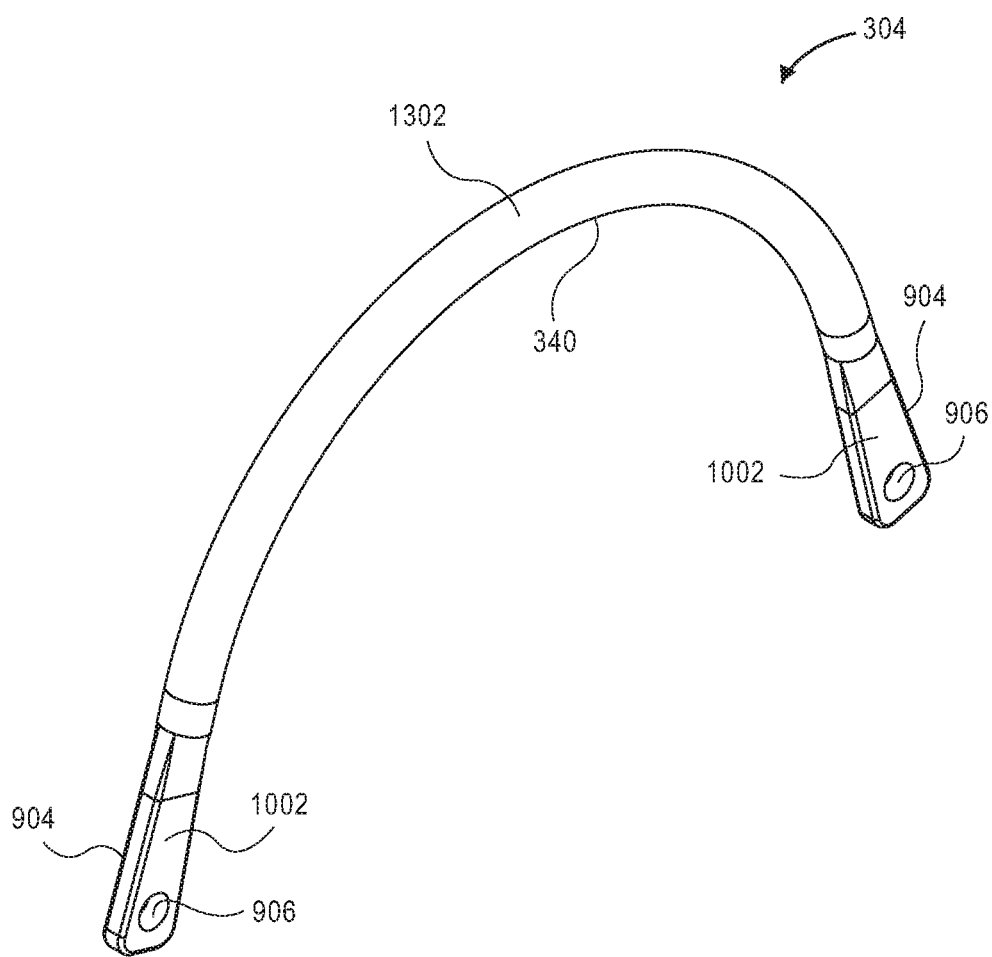
FIG. 13 illustrates a perspective view of a top bearing support in accordance with an embodiment of the present disclosure.

Referring to FIG. 13, a perspective view of a top bearing support is shown in accordance with an embodiment of the present disclosure. Top bearing support 304 may include an upsetted, e.g., stamped, rod portion 1302. Rod portion 1302 may, for example, include a solid shaft bent or otherwise formed to extend along a curved path. For example, the curved path may be a semi-circular path such that top bearing support 304 combines with bottom bearing support 302 to form a circular or toroidal supportive rim around shaft axis 106. Rod portion 1302 may have a circular cross-sectional area, and thus, top seat surface 340 may be semi-circular to receive top bearing sleeve 310 as described above.

Top bearing support 304 may include upper fastener tabs 904 at each end of rod portion 1302. Upper fastener tabs 904 may, for example, include flattened portions of the curved rod. Thus, upper fastener tabs 904 on either side of shaft axis 106 may include respective friction surfaces 1002. That is, the flattened upper fastener tabs 904 may have a pair of friction surfaces 1002, one on each longitudinal side of the respective tab.

As described above, a sequence of placement of top bearing support 304 tabs relative to bottom bearing support 302 tabs may be reversed such that upper fastener tabs 904 may be placed between lower fastener tabs 902. For example, the single upper fastener tab 904 on each side of top bearing support 304 having rod portion 1302 may be squeezed between a pair of lower fastener tabs 902 of respective bottom bearing supports 302. At least four friction interfaces 1102 may nonetheless be formed between the apposed friction surfaces 1002.

Installation tolerances may include a site slope that results in a misalignment tolerance between torque tube 102 and a longitudinal axis passing through bearing assembly 204. To adjust for such misalignment, upper fastener tabs 904 may include slotted upper fastener holes 906. That is upper fastener holes 906 may include one or more non-circular slots to allow for adjustability during installation to accommodate site slopes. Upper fastener holes 906 may also include one or more circular holes, however. Such variations have been described above with respect to other holes or openings of bearing assembly 204, and the same description applies to top bearing support 304 having rod portion 1302. Thus, top bearing support 304 may provide an effective support for torque tube 102 and bearing sleeve 306, and may be less costly to manufacture since tooling costs for upsetting a rod may be lower than tooling costs to form the stamped top bearing support 304 as shown in FIG. 3.

A PV system having a pair of bottom bearing supports to support a PV module has been described. Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A photovoltaic (PV) system, comprising:
   a pile having a web portion extending along a vertical plane to a pile end;
   a pair of bottom bearing supports bilaterally disposed about the web portion, each bottom bearing support including
      a shank portion apposed to the web portion,
      a fork portion having a lower end coupled to the shank portion and an upper edge having a first fork end and a second fork end above the pile end, and
      a sub-rim coupled to the upper edge of the fork portion, wherein the sub-rim includes a bottom seat surface having an arcuate cross-sectional profile revolved around a shaft axis extending orthogonal to the vertical plane, and wherein the bottom seat surfaces of the sub-rims define a bottom seat rim;
   a bottom bearing sleeve mounted on the bottom seat rim;
   a torque tube mounted on the bottom bearing sleeve, wherein the torque tube extends along the shaft axis and is pivotable about the shaft axis;
   a top bearing support having a top seat rim including a top seat surface having an arcuate cross-sectional profile revolved around the shaft axis;
   a top bearing sleeve mounted on the top seat rim, wherein the top bearing sleeve and the bottom bearing sleeve include respective supportive surfaces combining to define a circumferential supportive surface around the torque tube;
   a plurality of lower fastener tabs, wherein each lower fastener tab extends from one of the fork ends of the pair of bottom bearing supports, wherein the lower fastener tabs include respective friction surfaces parallel to the vertical plane, and respective fastener holes aligned along a first fastener axis extending orthogonal to the vertical plane;
   at least two upper fastener tabs coupled to the top seat rim, wherein the at least two upper fastener tabs include friction surfaces parallel to the vertical plane and facing respective friction surfaces of the lower fastener tabs, and respective fastener holes aligned with the respective fastener holes of the lower fastener tabs along the first fastener axis;

a fastener extending through the fastener holes of the upper fastener tabs and the lower fastener tabs to press the friction surfaces together; and a PV module mounted on the torque tube to track a solar source when the torque tube pivots about the shaft axis.

2. The PV system of claim 1, wherein the top seat rim and the bottom seat rim have U-shaped cross-sectional profiles.

3. The PV system of claim 1, wherein at least one of the fastener holes includes a non-circular slot.

4. The PV system of claim 1, wherein one or more of the bottom bearing supports includes a pair of retention prongs, each retention prong extending radially inward from a respective fastener tab at the fork ends toward the shaft axis, and wherein a distance between each retention prong and the shaft axis is less than a distance between the shaft axis and the bottom seat surface.

5. The PV system of claim 1, wherein the web portion and the shank portion have respective fastener holes aligned along a fastener axis extending orthogonal to the vertical plane.

6. A system, comprising:

a pile having a web portion extending along a vertical plane to a pile end;

a pair of bottom bearing supports bilaterally disposed about the web portion, each bottom bearing support including a shank portion apposed to the web portion, a fork portion having a lower end coupled to the shank portion and an upper edge having a first fork end and a second fork end above the pile end, and a sub-rim coupled to the upper edge of the fork portion, wherein the sub-rim includes a bottom seat surface having an arcuate cross-sectional profile revolved around a shaft axis extending orthogonal to the vertical plane, and wherein the bottom seat surfaces of the sub-rims define a bottom seat rim;

a bottom bearing sleeve mounted on the bottom seat rim;

a torque tube mounted on the bottom bearing sleeve, wherein the torque tube extends along the shaft axis and is pivotable about the shaft axis;

a top bearing support having a top seat rim including a top seat surface having an arcuate cross-sectional profile revolved around the shaft axis;

a top bearing sleeve mounted on the top seat rim, wherein the top bearing sleeve and the bottom bearing sleeve include respective supportive surfaces combining to define a circumferential supportive surface around the torque tube;

a plurality of lower fastener tabs, wherein each lower fastener tab extends from one of the fork ends of the pair of bottom bearing supports, wherein the lower fastener tabs include respective friction surfaces parallel to the vertical plane, and respective fastener holes aligned along a first fastener axis extending orthogonal to the vertical plane;

at least two upper fastener tabs coupled to the top seat rim, wherein the at least two upper fastener tabs include friction surfaces parallel to the vertical plane and facing respective friction surfaces of the lower fastener tabs, and respective fastener holes aligned with the respective fastener holes of the lower fastener tabs along the first fastener axis; and a fastener extending through the fastener holes of the upper fastener tabs and the lower fastener tabs to press the friction surfaces together.

7. The system of claim 6, wherein the top seat rim and the bottom seat rim have U-shaped cross-sectional profiles.

8. The system of claim 6, wherein at least one of the fastener holes includes a non-circular slot.

9. The system of claim 6, wherein one or more of the bottom bearing supports includes a pair of retention prongs, each retention prong extending radially inward from a respective fastener tab at the fork ends toward the shaft axis, and wherein a distance between each retention prong and the shaft axis is less than a distance between the shaft axis and the bottom seat surface.

10. The system of claim 6, wherein the web portion and the shank portion have respective fastener holes aligned along a fastener axis extending orthogonal to the vertical plane.

11. The system of claim 10, wherein the shank portion and the fork portion include respective inward surfaces facing the vertical plane, and wherein the inward surface of the fork portion is laterally farther from the vertical plane than the inward surface of the shank portion.

\* \* \* \* \*